United States Patent
Höglund

(10) Patent No.: US 12,453,412 B2
(45) Date of Patent: Oct. 28, 2025

(54) ADJUSTABLE TELESCOPIC LEG WITH LOCKING MECHANISM

(71) Applicant: Per Höglunds Innovation AB, Jönköping (SE)

(72) Inventor: Per Höglund, Jönköping (SE)

(73) Assignee: PER HÖGLUNDS INNOVATION AB, Jönköping (SE)

( * ) Notice: Subject to any disclaimer, the term of this patent is extended or adjusted under 35 U.S.C. 154(b) by 307 days.

(21) Appl. No.: 18/269,831

(22) PCT Filed: Dec. 22, 2021

(86) PCT No.: PCT/SE2021/051309
§ 371 (c)(1),
(2) Date: Jun. 27, 2023

(87) PCT Pub. No.: WO2022/146223
PCT Pub. Date: Jul. 7, 2022

(65) Prior Publication Data
US 2024/0057762 A1    Feb. 22, 2024

(30) Foreign Application Priority Data
Dec. 29, 2020   (SE) .................................. 2051570-6

(51) Int. Cl.
*A47B 9/04*    (2006.01)
*A47B 9/20*    (2006.01)

(52) U.S. Cl.
CPC .................. *A47B 9/04* (2013.01); *A47B 9/20* (2013.01); *A47B 2200/0054* (2013.01); *A47B 2200/0059* (2013.01)

(58) Field of Classification Search
CPC ............................ B62J 1/00; B62J 1/10; Y10T 403/32475-32524; A47B 9/042; A47B 2200/0054; A47B 2200/0059
See application file for complete search history.

(56) References Cited

U.S. PATENT DOCUMENTS

| 6,299,113 B1 | 10/2001 | Yamashita et al. |
| 10,524,564 B1 * | 1/2020 | Wu .......................... A47B 9/20 |

(Continued)

FOREIGN PATENT DOCUMENTS

| CN | 108618371 A | 10/2018 |
| EP | 1302133 A1 | 4/2003 |
| WO | 9203948 | 3/1992 |

OTHER PUBLICATIONS

International Search Report and Written Opinion for co-pending PCT/SE2021/051309, 11 pages, Jan. 11, 2022.

*Primary Examiner* — Daniel J Wiley
(74) *Attorney, Agent, or Firm* — Kagan Binder, PLLC

(57) ABSTRACT

The invention relates to a telescopic column (2) and a method for collapsing and extending the telescopic column (2) for a height adjustable furniture. The telescopic column (2) comprising an outer column (210), an intermediate column (220), an inner column (230) and a fixating member (400) configured to fixate the height position of the intermediate column (220) at a predetermined height position relative the outer column (210) when said telescopic column (2) is in an upper stroke range. Wherein the inner column (230) is adapted to be driven by a driving unit and comprises a first engaging portion for interacting with the fixating member (400) such that the fixating member (400) is disengaged and enables the inner column (230) to move in tandem with the intermediate column (220) relative the outer column (210), when the telescopic column (2) is in a lower stroke range and wherein the fixating member (400) is resiliently loaded.

11 Claims, 8 Drawing Sheets

(56) References Cited

U.S. PATENT DOCUMENTS

| | | | |
|---|---|---|---|
| 10,531,732 B1* | 1/2020 | Huang | F16B 7/14 |
| 11,974,669 B1* | 5/2024 | Klein | A47B 9/20 |
| 2012/0145844 A1 | 6/2012 | Glowinska et al. | |
| 2016/0296006 A1 | 10/2016 | Bonuccelli | |
| 2018/0140087 A1* | 5/2018 | Wu | F16H 25/2056 |
| 2019/0357668 A1* | 11/2019 | Knudtson | A47B 9/04 |
| 2020/0077788 A1* | 3/2020 | Albers | A47B 9/20 |
| 2020/0085184 A1 | 3/2020 | Lu | |
| 2022/0104613 A1* | 4/2022 | Schaerer | A47B 9/04 |
| 2022/0243793 A1* | 8/2022 | Hu | A47B 9/04 |

* cited by examiner

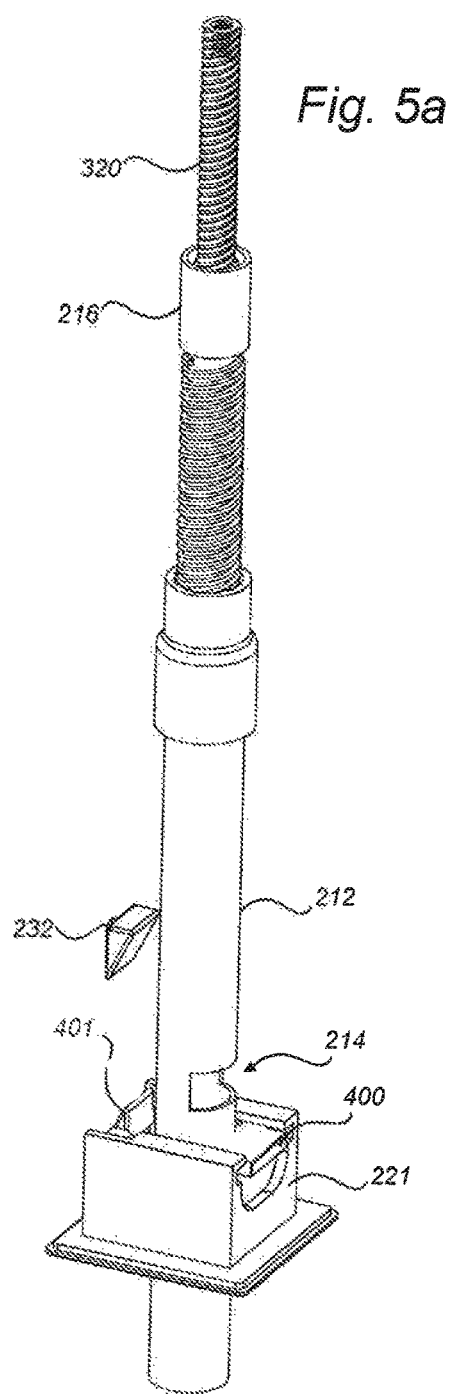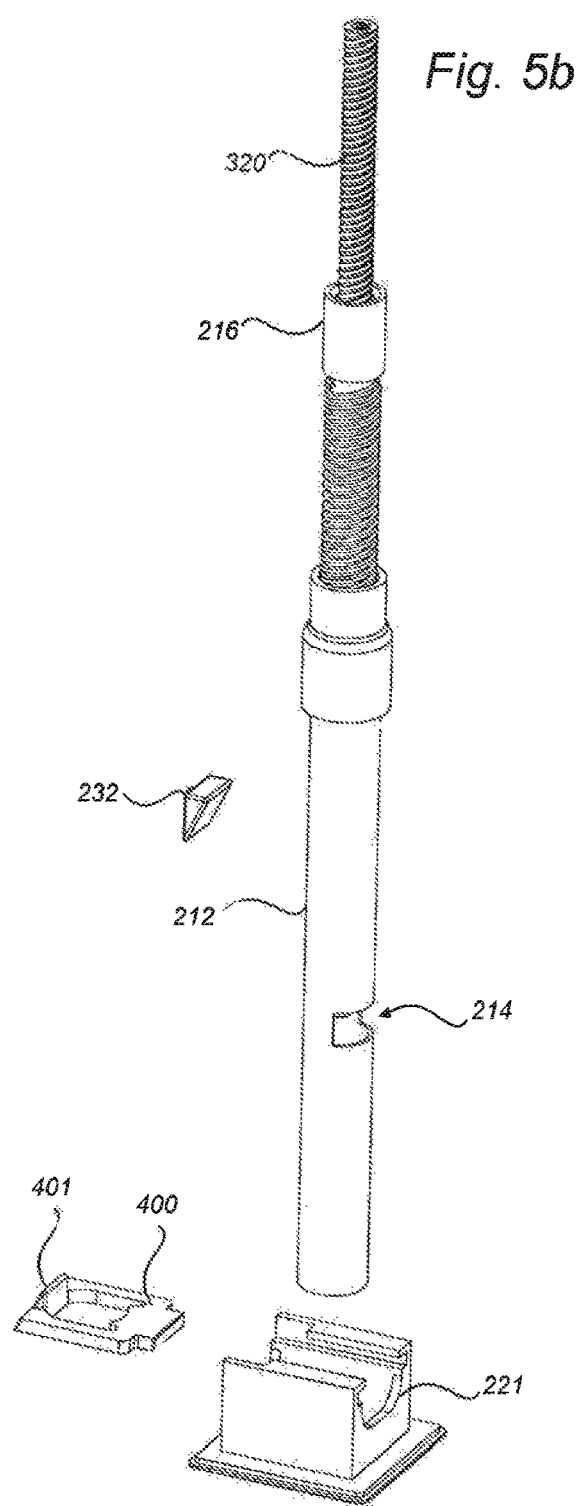

ADJUSTABLE TELESCOPIC LEG WITH LOCKING MECHANISM

CROSS-REFERENCE TO RELATED APPLICATIONS

This application claims priority to International Application No. PCT/SE2021/051309, filed Dec. 22, 2021, which in turn claims priority from Sweden Patent Application having serial number 2051570-6, filed on Dec. 29, 2020, both of which are incorporated herein by reference in their entireties for all purposes.

TECHNICAL FIELD OF THE INVENTION

The present invention relates to a telescopic column for a height adjustable furniture, a height adjustable furniture comprising the telescopic column and a method for collapsing and extending a telescopic column of a height adjustable furniture.

BACKGROUND

Height adjustable furniture are commonly used to enhance the ergonomics for a user using the furniture. For example, height adjustable desks or workbenches can easily be adapted to fit the user and offer enhanced ergonomics in either a seated or standing position. Further, users of different lengths can comfortably use the same table or workbench by adjusting the height to a suitable level.

In existing solutions, telescopic columns are often employed to provide the height adjustability of the furniture. For example, height adjustable desks may comprise a telescopic column in each leg of the desk. In some implementations, to allow a greater adjustability range, the telescopic columns comprise three column portions being placed radially inside each other. An electric or manually driven motor is coupled to a linear screw or belt mechanism located inside the column portions so as to provide a driving force which extends or contracts the telescopic column by moving the column portions in relation to each other. For example, a driving unit provided in the bottom of a furniture leg drives a linear screw which pushes the two above column portions upwards. A second driving unit, provided in one out of the upper two column portions subsequently enables a second linear which pushes one of the two upper column portions further upwards. In this way, multiple column portions, linear screws and driving units may be combined to form a telescopic column capable of extending and retracting. In other implementations, a driving unit is placed in the middle leg column and drives two linear screws simultaneously, to allow a greater adjustability range.

A problem with the existing solutions, however, is that the telescopic columns in an extended state often are less stable in comparison to a retracted state. This instability introduced in the higher states may prohibit the furniture from being usable in practice for the highest extended states.

SUMMARY

In view of the shortcomings of the existing solutions there is a need for an improved telescopic column and a method for extending and retracting a telescopic column. It is an object of the present invention to overcome these shortcomings, and to provide an improved telescopic column and an improved method for extending and retracting such a telescopic column.

According to a first aspect of the invention there is provided a telescopic column for a height adjustable furniture. The telescopic column comprising an outer column, an intermediate column, located radially inside the outer column and an inner column, located radially inside the intermediate column. The telescopic column further comprising a fixating member configured to fixate the height position of the intermediate column at a predetermined height position relative the outer column when said telescopic column is in an upper stroke range wherein the inner column is adapted to be driven by a driving unit and comprises a first engaging portion for interacting with the fixating member such that the fixating member is disengaged and enables the inner column to move in tandem with the intermediate column relative the outer column, when the telescopic column is in a lower stroke range.

With upper stroke range it is meant that the telescopic column is in an extended state wherein only the inner column is raised or lowered by the driving unit with respect to the intermediate column and the outer column. The upper stroke range comprises the telescopic column in its maximum extended length and a range of extended lengths lying between the maximum extended length and the extended length at which the inner and intermediate columns first moves in tandem, when the telescopic column is retracting from an upper stroke range state. Similarly, the lower stroke range comprises the telescopic column in its minimum extended length and a range of extended lengths lying between the minimum extended length and the extended length at which the inner column and intermediate column stops to move in tandem, when the telescopic column is extending from a lower stroke range state. As will be described in the below, the lower and upper stroke ranges are not necessarily mutually exclusive intervals for extension length of the telescopic column, as they may in some implementations partially overlap.

The invention is at least partially based on the understanding that by fixating the height position of the intermediate column at a predetermined height position relative the outer column the stability of the telescopic column is enhanced. That is, in the upper stroke range the fixating member is adapted to fixate the intermediate column to the outer column which enhances stability as the outer and intermediate columns becomes reliantly fixated to each other in the upper stroke range. In contrast, some previous solutions implement extending columns wherein the inner and intermediate column moves relative each other and the outer column throughout the entire stroke length. For example, prior solutions are such that the intermediate column extends/retract more rapidly while the inner column extends/retracts more slowly.

With the invention the inner and intermediate columns move in tandem in the lower stroke length which enhances stability in the lower stroke range. The predetermined position at which the fixating member is configured to fixate the intermediate column to the outer column may be selected so as to optimize stability for the telescopic column. For instance, the predetermined position may be selected to optimize an average stability for every state of the telescopic column or for a range of extended states, such as the maximum extended state or all states in the upper stroke range. For example, computer simulations may be performed so as to determine the optimal predetermined height position at which the intermediate column should be fixated to the outer column for the upper stroke length. By simulating the mechanical and material properties of the telescopic column (e.g. under different types of stress) the height position of the intermediate column relative the outer column at which the two columns are to be fixated to each other may be determined so that the telescopic column is as stable as possible for at least a portion of the total stroke range of the telescopic column.

The telescopic column may be adapted to be driven by a single driving unit. The driving unit adapted to drive the inner column is sufficient for extending and retracting the entire telescopic column as well as disengaging the fixating member. Accordingly, the driving unit may be arranged inside the inner column or be arranged externally from the inner column and be coupled to the inner column. For example, the driving unit may be fastened to the underside of a table top and be coupled to the inner column being fastened to the table underside of the table top. Alternatively, the telescopic column is adapted to be driven from a lower end portion of the telescopic column, with the driving unit e.g. provided in or adjacent to the outer column. With a single driving unit the system weight and reliability is facilitated as fewer components and moving parts are needed.

The telescopic column may further comprise a central body being axially fixated to the outer column and being located radially inside the inner column, wherein said central body is adapted to interact with the fixating member. An axially fixated central body of the outer column provides an additional point of contact between the outer column and the intermediate column, via the fixating member which facilitates stability in at least the upper stroke range. The central body does not prohibit the sliding motion of the three columns. Moreover, with a central body the outer column does not require any features or fixating indentations being added to the outer casing portion of the column, which facilitates manufacturing, stability and may help providing a more visually pleasing telescopic column. In some implementations, the central body is hollow and is adapted to receive a linear screw of the inner column which is rotated by the driving unit. Moreover, the central body may comprise a threaded portion being in threaded engagement with the linear screw so as to lift or lower the inner column relative the outer column when the linear screw is rotated. Alternatively, the central offers an additional point of contact with the threaded portion being arranged separately.

In some implantations the central body comprises an aperture for receiving the fixating member. An aperture for receiving the fixating member is an efficient way of supporting the fixating member with the central body. The positioning of the aperture may be anywhere along the central body and will dictate the maximum height position of the intermediate column relative the outer column. For example, the position of the aperture along central body may be determined with computer simulations so as to maximize stability of the telescopic column.

Furthermore, the fixating member may be resiliently loaded towards a fixating position. The fixating position may be the position of the fixating member when the fixating member is received in an aperture or slot provided in the central body. The resilient force may be enabled by a spring or other type of elastic element. In some implementations, the resiliently loaded fixating member is automatically inserted into the fixating position by the resilient load when the intermediate and inner column moves in tandem towards an extended state in the upper stroke length. When the inner column moves relative the intermediate column, from an upper stroke range state towards a lower stroke range state, the resilient force of the resiliently loaded fixating member is counteracted by the engaging portion of the inner column so as to disengage the fixating member from its fixating position. Resiliently loading the fixating member against the fixating position means that no additional components are needed to insert the fixating member in the fixating position. Thus, an engaging portion for disengaging suffices.

In some implementations, the fixating portion is axially fixated to the intermediate column. The fixating member being axially fixated to the intermediate column means the fixating member will reliantly and axially fixate the intermediate column relative the outer column while in an extended stroke length. With the fixating member being fixated to the intermediate column the upper column is free to extend or contract further when the fixating member is in the engaged position, while the inter and intermediate column are enabled to move in tandem at the lower stroke length. The fixating member being axially fixated to the intermediate column means that the engaging portion of the inner column may disengage the fixating member at a more appropriate height position of the telescopic column, for example when the inner column is essentially entirely enclosed by the intermediate column.

Alternatively, the fixating member may be axially fixated to the inner and/or outer column. For example, the central body of the outer column moves an element of the fixating member out of engagement with the intermediate column as the telescopic column is extending from the lower to the upper stroke range. Effectively enabling the inner column to move in height with respect to the intermediate column. Also, another element of the fixating member (for example a spring-loaded element) may be fastened to the outer column or its central body and be adapted to engage the intermediate column as the inner column is enabled to move in height with respect to the intermediate column so as to fixate height position of the intermediate column relative the outer column. When the inner column is retracted from an upper stroke range position towards a lower stroke range position the engaging member of the inner column (being for example wedge-shaped) may disengage the another element of the fixating member which enables the intermediate column to move with respect to the outer column while the first element of the fixating member axially fixated to the inner column is manipulated by the central body of the outer column to engage the intermediate column so as to enable movement in tandem for the lower stroke range.

In some implementations, the inner column comprises a lifting portion, wherein said lifting portion is adapted to lift said intermediate column at the lower stroke range. Accordingly, even for implementations wherein a single driving unit drives the movement of the inner column the intermediate column may be lifted by the inner column at the lower stroke range. In some implementations, wherein the fixating member is fixated to the intermediate column the fixating member being disengaged from the predetermined fixating position may bring the fixating unit into a state enabled to contact the lifting portion and be lifted by the inner column.

According to a second aspect of the invention there is provided a furniture comprising the telescopic column according to the first aspect of the invention. Furniture types making use of the extendible column comprises desks, tables, workbenches, chairs and beds. The furniture may comprise one or more extendible columns operating in tandem, for example, a height adjustable desk preferably comprises at least two extendible columns e.g. implemented as the legs of the desk. In other implementations, for example when the furniture is a bed, two or more telescopic columns may operate in tandem so as to raise or lower the bed or extend/retract at different rates so as to angle or shape the surface of the bed.

According to a third aspect of the invention there is provided a method for collapsing and extending a telescopic column for a height adjustable furniture. The method comprising the steps of from an extended state, downwardly moving an inner column inside an intermediate column towards a first predetermined engaging position, in the first predetermined engaging position disengaging a fixating member, the fixating member fixating the height position of the intermediate column relative an outer column, moving said inner column and said intermediate column in tandem inside said outer column towards a collapsed state, from a collapsed state, extending said inner column and said intermediate column in tandem towards a second predetermined engaging position, in the second predetermined engaging position, fixating the height position of the intermediate column relative the outer column, and moving said inner column towards an extended state.

Accordingly, by only moving the inner column down relative the intermediate column towards the first predetermined engaging position and only moving the inner column up after the second predetermined engaging position the inner column is only exposed for the greatest extensions of the telescopic column. This enhances stability compared to solutions wherein the inner column rises first, preceding the rising of the intermediate column. Inherently, stability becomes more of an issue for greater extensions of the telescopic column. With the invention, the intermediate column is fixated in its height position relative the outer column and thereby offers a stable point of support at a higher position when the telescopic column extends into its most inherently unstable states i.e. the states with the greatest extension.

The first and second predetermined engaging positions may be a same or different positioning of the three telescopic columns relative each other. In some implementations, the position between the inner and intermediate column when the intermediate column is fixated to the outer column and the position between the inner and intermediate column when the intermediate column is disengaged from being fixated to the outer column differs, due to different portions of the inner column being responsible for pulling the intermediate column and disengaging the fixating member.

In some implementations the step of disengaging the fixating member comprises pushing the fixating member with a first engaging portion of the inner column from an engaged state to a disengaged state. In some implementations the step of engaging the fixating member comprises pushing the fixating member with a second engaging portion of the inner column from a disengaged state to an engaged state. By pushing the fixating member with a first and/or second engaging portion to an engaged or disengaged state respectively the process of engaging or disengaging the fixating member may be facilitated so as to be more reliable and introduce smaller resistance to the movement of the inner column. The movement of the inner column being indirectly the action which manipulates the fixating member. For example, pushing the fixating member with a first engaging portion of the inner column from an engaged state to a disengaged state may comprise pushing the fixating member out of engagement with the central body or an aperture of the central body. Pushing the fixating member with a second engaging portion of the inner column from a disengaged state to an engaged state may comprise engaging the fixating portion with a lip pushing the fixating member towards the engaged state and/or pushing the fixating member towards a position wherein a resiliently loaded fixating member enters the engaged state.

The invention according to the second and third aspects features the same or equivalent embodiments and benefits as the invention according to the first aspect. Further, any functions described in relation to a method, may have corresponding structural features in a system or device and vice versa. It is noted that the invention relates to all possible combinations of features recited in the claims.

BRIEF DESCRIPTION OF THE DRAWINGS

These and other aspects of the present invention will now be described in more detail, with reference to the appended drawings showing exemplar embodiments of the present invention, wherein:

FIGS. 5a and 5b depicts exploded views of some features of the telescopic column.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Although the examples are illustrated together with a height adjustable desk, the invention may be implemented in other furniture such as sofas, beds, chairs or other furniture where height adjustability is desirable.

Figure 1:
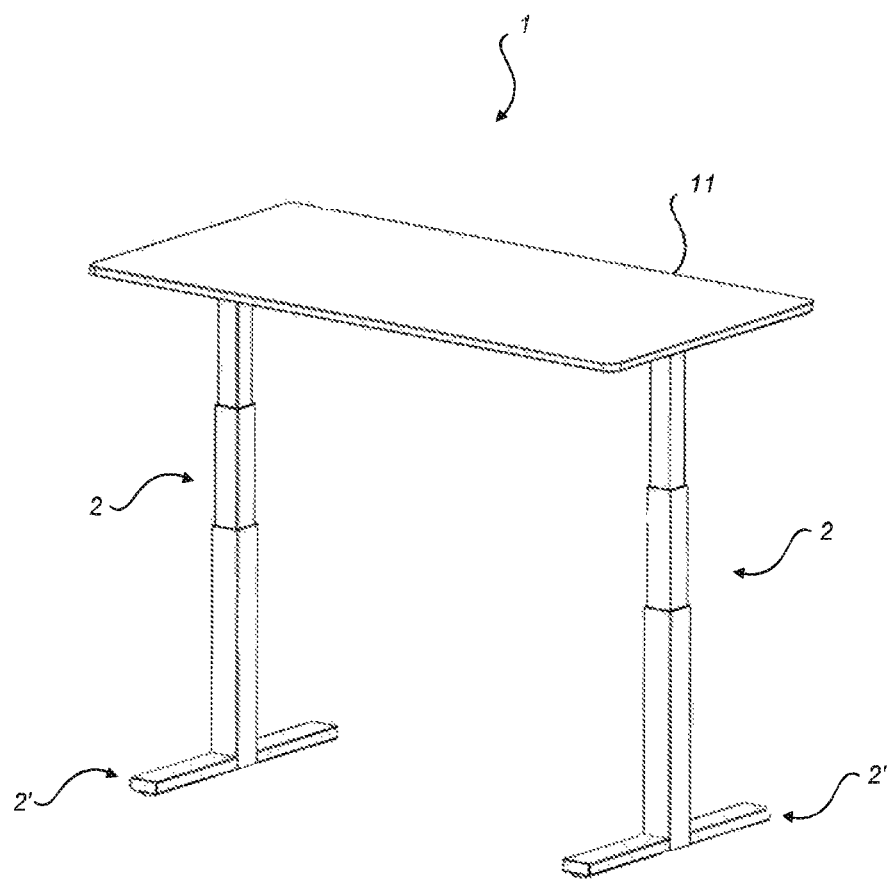
FIG. 1 is an exemplary height adjustable furniture comprising the telescopic column according to embodiments of the present invention.

FIG. 1 depicts a height adjustable furniture 1 (a height adjustable desk) comprising two telescopic columns 2 serving as the legs of the desk 1, by being mounted to the desktop 11. Additionally, the telescopic column(s) 2 may comprise, or be adapted to be fixated to, a foot portion 2' so as to stabilize the table. For example, the outer column may comprise, or be adapted to be fixated to, a foot portion 2' to facilitate stability. The driving unit of the telescopic columns 2 may be adapted to extend and collapse the telescopic columns 2 so as to raise and lower the position of the desktop 11 relative the ground level. A user may thus conveniently adjust the position of the desktop 11 relative the floor so as to adapt the desk 1 for use from e.g. a seated or standing position. This may be accomplished by the user controlling the driving unit either by e.g. pushing a button provided on the desk 1 (being connected to the driving unit) or the user sending raise/lower instructions from a user device to the driving unit of the telescopic column(s).

Figure 2A:
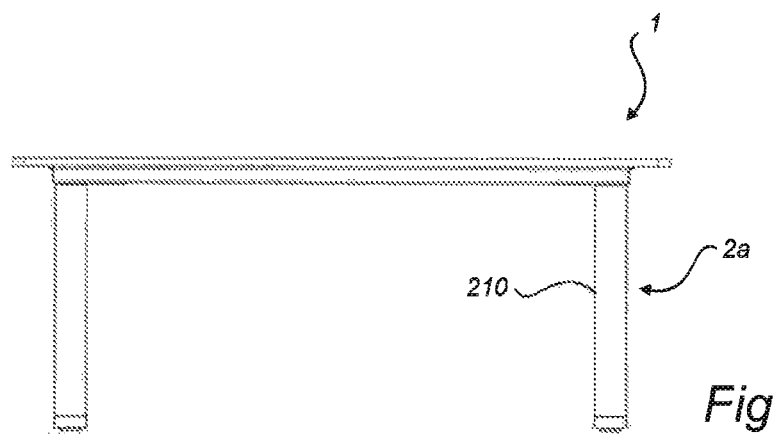
FIG. 2a, 2b, 2c is a height adjustable furniture comprising a telescopic column in different height positions.

With reference to FIG. 2a a height adjustable furniture (desk) 1 is depicted with the telescopic column in a retracted or fully retracted state 2a. In the retracted state the inner column is located radially and at least partially axially inside the intermediate column while the intermediate column is located radially and at least partially axially inside the outer outer column 210. Accordingly, the height adjustable furniture 1 is in a corresponding retracted state wherein the extending length of the telescopic columns is small. The telescopic column in state 2a is in the lower stroke range.

Figure 2B:
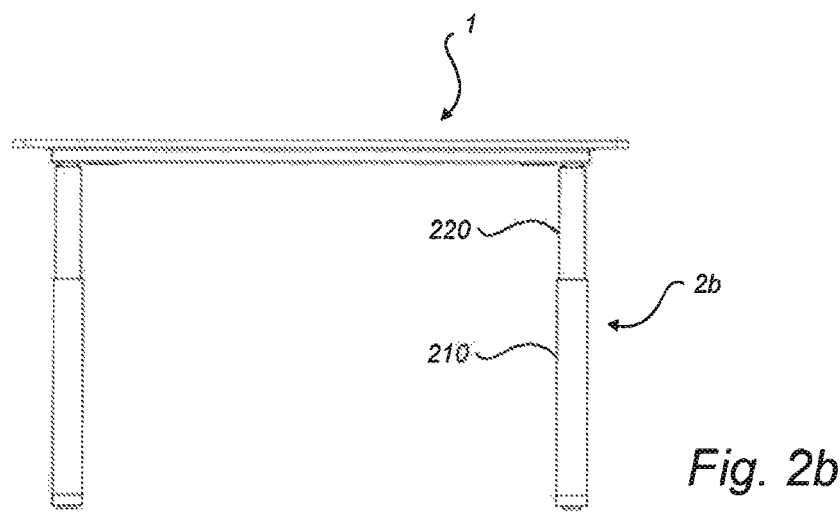

With further reference to FIG. 2b the telescopic column is depicted in a partially extended state 2b. By driving the inner column upwards the inner column moves upwards in tandem with the intermediate column 220 with respect to the outer column 210, thereby making the telescopic column transition from state 2a to state 2b.

Figure 2C:
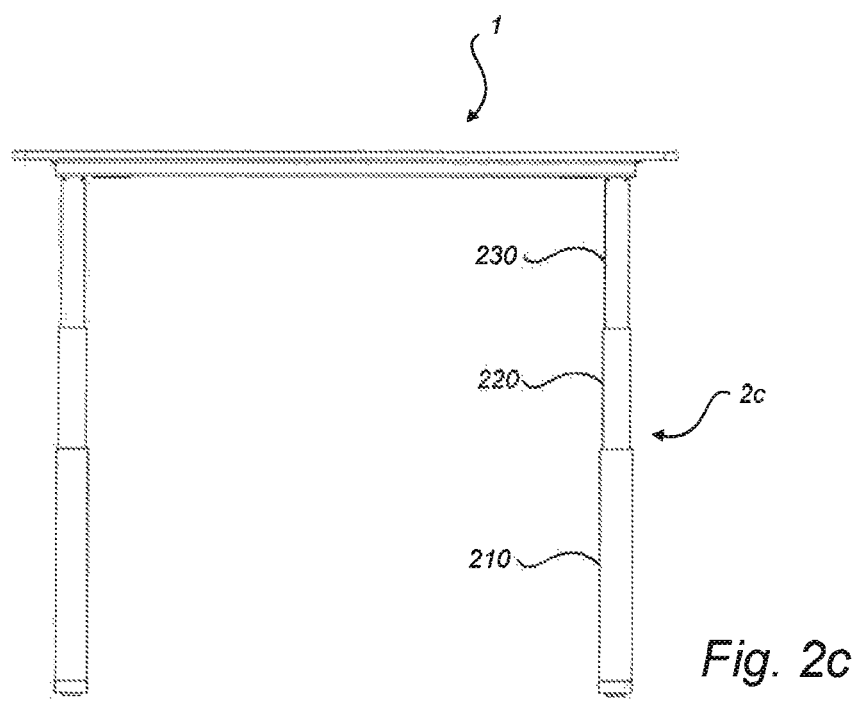

With further reference also to FIG. 2c the telescopic column is depicted in an upper stroke range state 2c. When extending the telescopic column from state 2b to state 2c the telescopic column passes the second predetermined engaging position which fixates the position of the intermediate column 220 to the outer column 210, after which only the inner column 230 extends further from the other columns 210, 220 in the upper stroke range. Even in the upper stroke range for a telescopic column there may remain an at least partial axial overlap between the outer and intermediate columns 210, 220 and the intermediate and inner columns 220, 230.

Similarly, downwardly moving the inner column 230 inside the intermediate column 220 from state 2c means that the telescopic column will approach the first predetermined engaging position wherein the fixating member fixating the intermediate column 220 to the outer column 210 is disengaged. By continuing to lower the inner column 230 the disengaged fixating member enables the intermediate column 220 to move in tandem with the inner column 210 towards state 2b, and ultimately state 2a.

Figure 3:
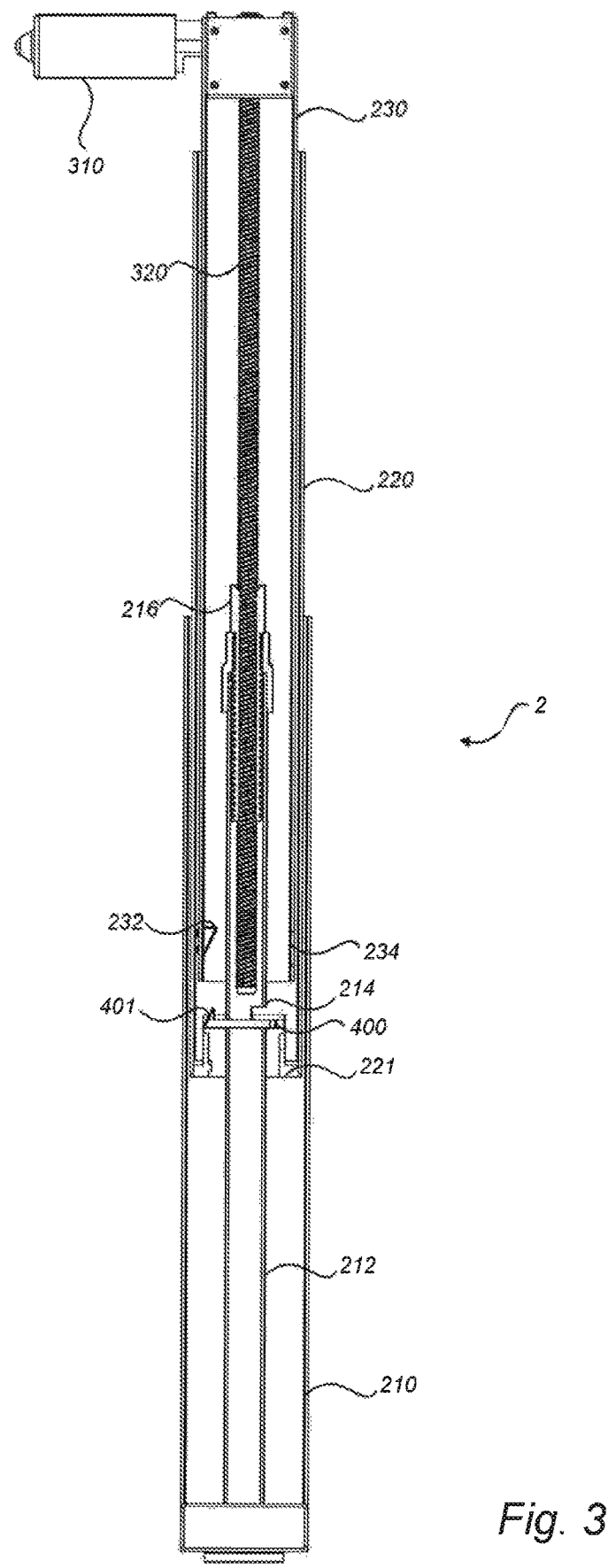
FIG. 3 is a cross-sectional view of a telescopic column in the upper stroke range according to embodiments of the present invention.

FIG. 3 depicts a cross-sectional view of a telescopic column 2 according to embodiments of the invention in an upper stroke range state. The depicted embodiment comprises a single drive unit 310 which may comprise an electric motor or be manually operated so as to drive the movement of the inner column 230 upwards or downwards with respect to the outer column 210. The telescopic column 2 may comprise a central body 212 axially fixated to the outer column 210 while being located radially inside the inner column 230. The central body 212 may comprise a hollow structure and threads in the hollow structure so as to double as a portion which is adapted to engage a linear screw 320 mechanically coupled to the driving unit 310. The linear screw 320 being coupled to the driving unit 310 such that the driving unit 310 may rotate the linear screw 320 in one out of two directions. One rotational direction bringing the inner column 230 down towards the outer column 210 and the other rotational direction bringing the inner column 210 up and away from the outer column 210.

In some implementations, the linear screw 320 engages a threaded hollow structure of a hollow extension screw 216, wherein the hollow extension screw 216 may be threaded in and out of the threaded portion, optionally provided in the central support body 212, and the linear screw 320 may in turn be threaded in and out of the hollow extension screw 216. The hollow extension screw 216 may be adapted to be activated in the upper stroke range of the telescopic column. That is, the hollow extension screw 216 remains stationary while the linear screw 320 is threaded out of the central support body 212 and the extension screw 320 as the telescopic column passes the second predetermined engaging position (fixating the intermediate column 220 to the outer column 210) and approaches an extended state. At a predetermined extension screw activating position, the linear screw 320 interlocks with the extensions screw 216 whereupon the extension screw 216 is threaded out of the central support body 212. Accordingly, the extension screw 216 is only used for the greatest extension states of the upper stroke range of the telescopic column 2. When threading the linear screw 320 into the extension screw 216 and the central support body 212 from a greatest extension state the extension screw is first threaded into the central support body 212 until the predetermined extension screw activating position is reached. Then, when the extension screw 216 is stationary with respect to the central support body 212 the linear screw 320 starts to be threaded into the extension screw 216 and the central support body 212.

Use of an extension screw 216 allows the telescopic column 2 to feature a larger difference in length between the fully extended and the fully retracted states. With an extension screw 216 the difference in extension length may be greater than the length of the linear screw. In some implementations, the telescopic column 2 is adapted for use as a leg for a height adjustable desk wherein the fully retracted state features a length of approximately 60 cm and the fully extended state features a length of 130 cm, i.e. the telescopic column features a length difference between its fully retracted state and fully extended state of approximately 70 cm.

The linear screw 320 and the extension screw 216 may be of any material, for example metal or plastic. To facilitate manufacturing, cost and system weight the linear screw 320 may be made of metal while the extension screw 216 is made of plastic. As the extension screw 216 may feature a larger outer diameter and be shorter compared to the linear screw 320 (factors which enable enhanced stability) use of an extension screw 216 made of a cheaper and lighter material (such as plastic) compared to the linear screw 320 is enabled while facilitating stability.

Moreover, the linear screw 320 being axially fixated to the inner column 230 and rotating relative a threaded portion of the outer column 210 is merely an example, the driving 310 unit may be adapted to rotate a linear screw 320 axially fixated to the outer column 210 in a threaded portion axially fixated to the inner column 230.

FIG. 3 depicts the telescopic column 2 in the upper stroke range. The fixating member 400 fixates the height of the intermediate column 220 relative the outer column 210 while the inner column 230 is free to move up or down by manipulating the linear screw 320. In the embodiment shown, the central body 212 is axially fixated to the outer column 210 wherein the central body interacts with the fixating member 400 by having the fixating member 400 resting on the central body 212. The fixating member 400 of the depicted embodiment is fixated to the intermediate column 220 via a fixating member housing 221.

The inner column 230 comprises a first engaging portion 232 for interacting with the fixating member 400. In some implementations, the engaging portion 232 is a wedge, ramp or lip which is adapted to gradually push the fixating member 400 to a disengaged state as the inner column 230 descends towards the outer column 210. The fixating member 400 may comprise a corresponding engaging portion 401 (such as a wedge or ramp shaped portion) adapted to interact with the engaging portion 232 of the inner column so as to facilitate proper disengagement at the first predetermined engaging position. The engaged state, exemplified in FIG. 3, may comprise the fixating member 400 being inserted into an aperture 214 provided in the central body 212.

The inner column 230 may comprise a second engagement portion 234 for pushing the fixating member 400 from a disengaged state into the engaged state. In the depicted embodiment of FIG. 3 the second engaging portion is a slot 234 provided in the inner column. In other embodiments, the second engaging portion 234 is a wedge, ramp or lip which engages the fixating member 400 so as to push it into the engaged state when the telescopic column is in the second predetermined engaging position.

FIGS. 4a, 4b, 4c, 4d, 4e and 4f depicts a portion of the cross-sectional view of the telescopic column as the telescopic column retracts from an upper stroke range position, passes the first predetermined engaging portion, retracts from a lower stroke range position, extends from a lower stroke range position, passes the second predetermined engaging position and extends from an upper stroke range position.

Figure 4A:
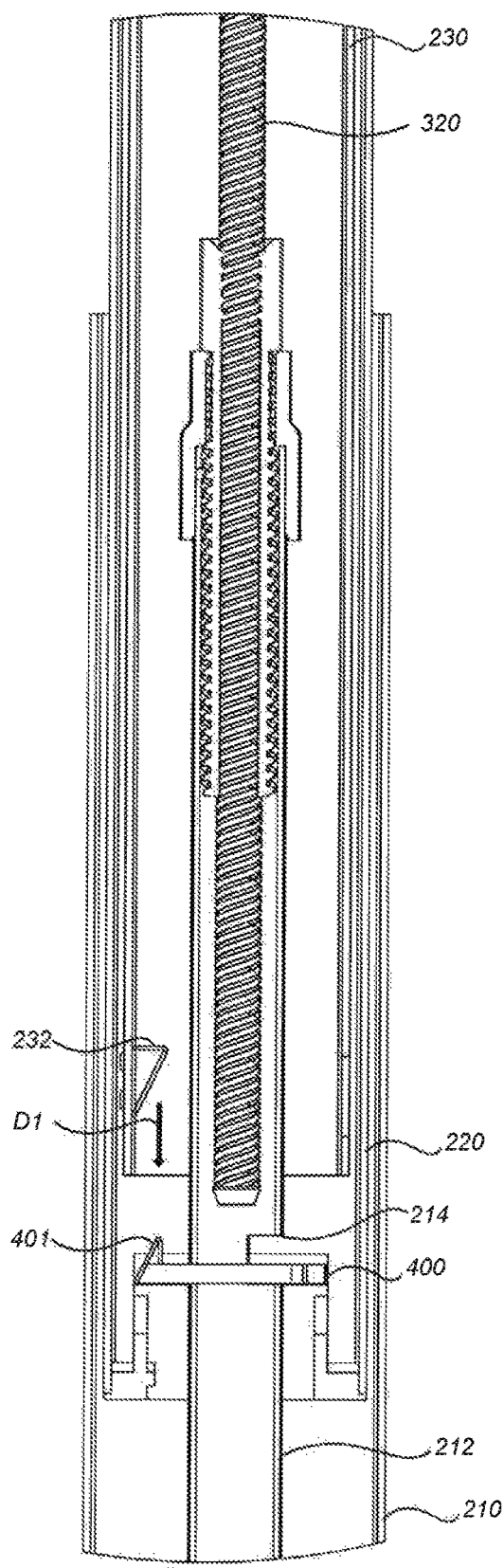
FIGS. 4a, 4b and 4c illustrates cross-sectional views of a telescopic column according to embodiments of the present invention wherein the telescopic column transitions from the upper stroke range to the lower stroke range.

In FIG. 4a the telescopic column retracts by moving the inner column 230 towards the outer column 210 in the direction D1. The intermediate column 220 is fixated at a predetermined height position relative the outer column 210, in the embodiment shown this is enabled by the fixating member 400 resting in an aperture 214 provided in the central body 212 of the outer column 210.

Figure 4B:
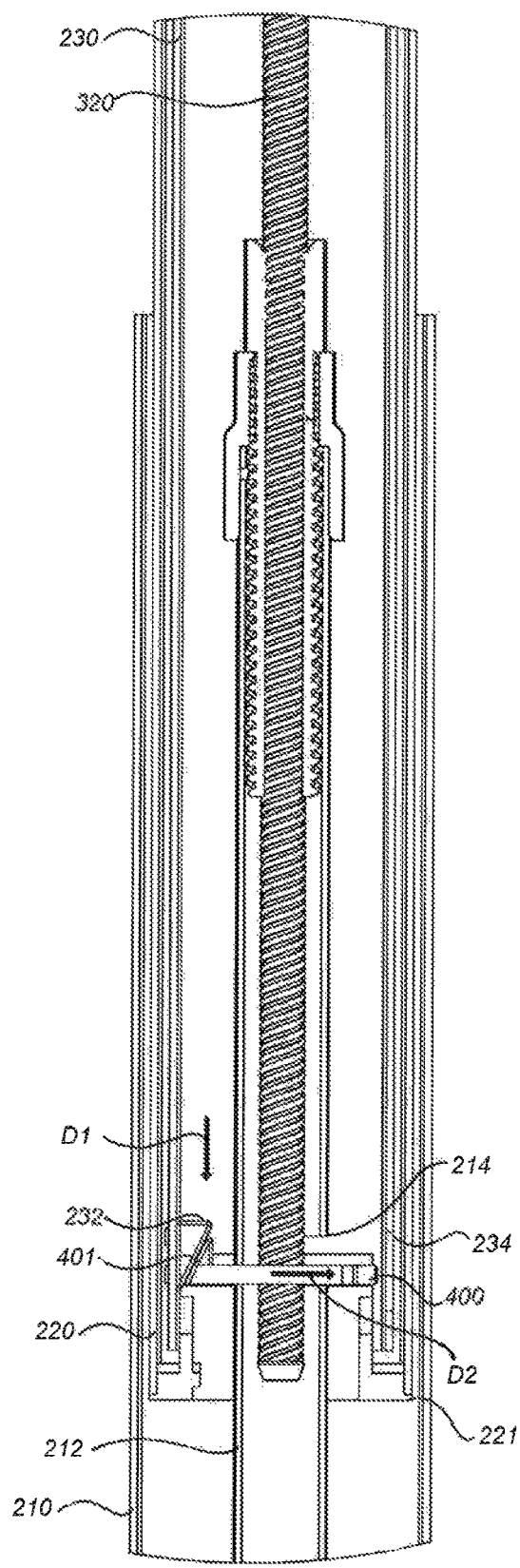

Turning to FIG. 4b, the inner column 230 continues to be moved (e.g. by rotating the linear screw 320) so as to approach the outer column 210. The first engagement portion 232 engages the fixating portion 400 so as to push the fixating member 400 in direction D2, towards the disengaged state. Optionally, the inner column 230 may be provided with a second engaging portion in the form of a slot 234 which receives the fixating member 400 when the fixating member 400 is pushed into the disengaged state. A side of the slot 234 will engage the fixating member so as to push it towards the engaged state, that is, substantially in a direction opposite to that of D1. The slot 234 may further reliantly hold the inner column 230 and the intermediate column 220 together such that the columns 220, 230 moves in tandem. Preferably, to allow proper functioning even with some manufacturing and alignment errors the slot 234 may be large enough to receive the fixating member 400 at a variety of positions. Accordingly, while moving the columns 220, 230 in tandem downwards their position relative each other (a top side of the slot 234 pushes the fixating member 400) may be different to their relative position when the columns 220, 230 move upwards in tandem (a bottom side of the slot 234 pushes the fixating member 400). The same applies to other embodiments and embodiments wherein the second engaging portion 234 is a lip or wedge which may engage the disengaged fixating member 400 so as to push it down or up in tandem with the inner column 230. For the upwards tandem movement of the inner column 230 and the intermediate column 220 the second engagement portion 232 may be arranged so as to push the intermediate column 220 up by the motion of the inner column 230.

Figures 4C, 4D:
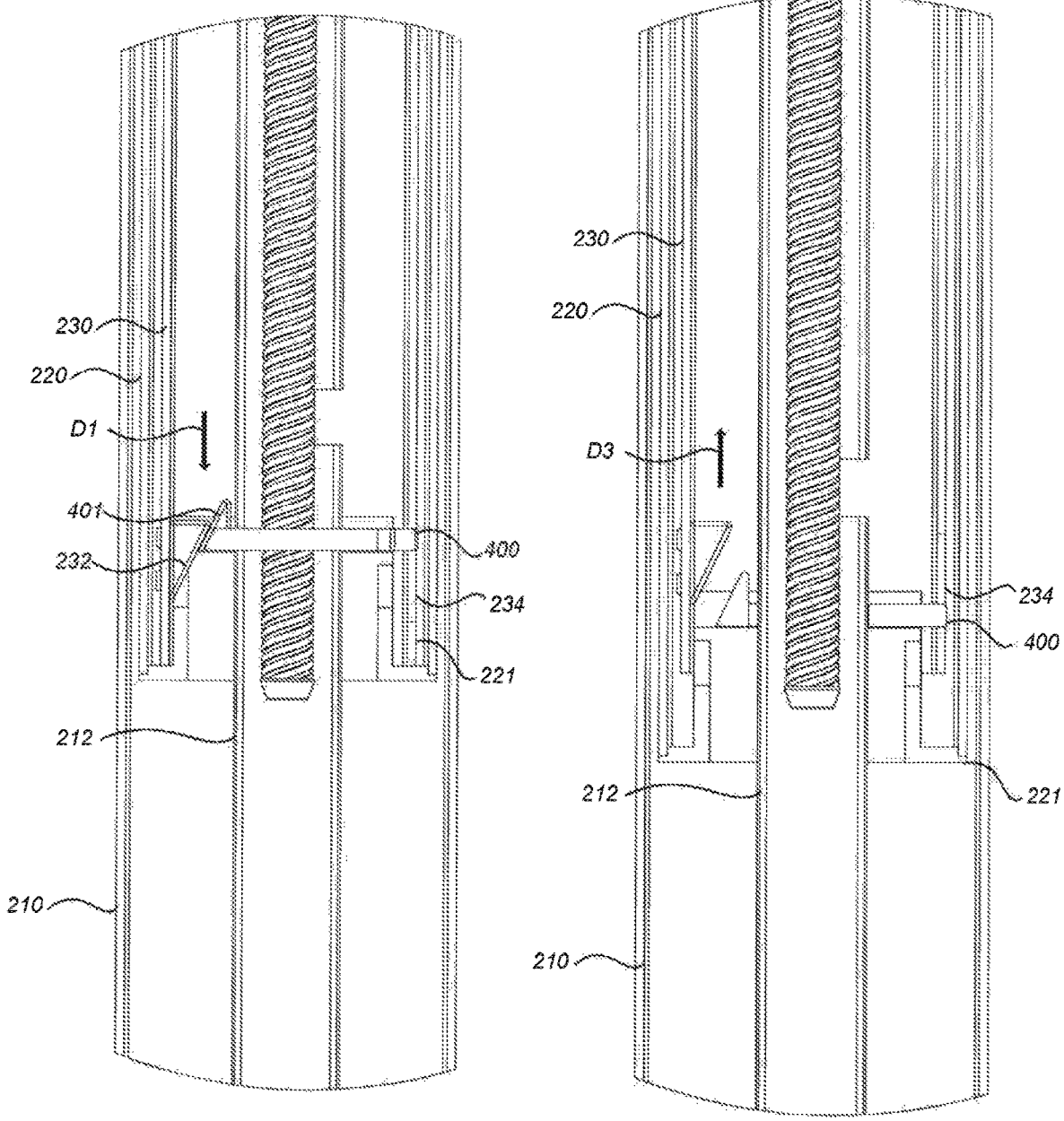
FIGS. 4d, 4e and 4f illustrates cross-sectional views of a telescopic column according to embodiments of the present invention wherein the telescopic column transitions from the lower stroke range to the upper stroke range.

In FIG. 4c the fixating member 400 is disengaged, and the inner column 230 and the intermediate column 220 moves in tandem downwards in direction D1. As seen, the first engaging portion 232 may be adapted to disengage the fixating member 400 and to engage the intermediate column (e.g. via the fixating member 400) to push the intermediate column 220 down in tandem with the inner column 230. The inner column 230 and intermediate column 220 may continue to move downwards in tandem, into the outer column 210, until the telescopic column reaches its fully retracted state. Thus, the telescopic column in FIG. 4c is in a lower stroke range state and moves towards a retracted state.

In FIG. 4d the telescopic column is in a lower stroke range state and extends upwards in direction D3 towards the second predetermined engaging position. The inner column 230 and intermediate column 220 moves in tandem as the inner column 230 is driven upwards. For example, the inner column 230 engages the fixating member 400 in the disengaged state, being axially fixated to the intermediate column 220, and pulls the intermediate column 230 upwards in tandem.

Figure 4E:
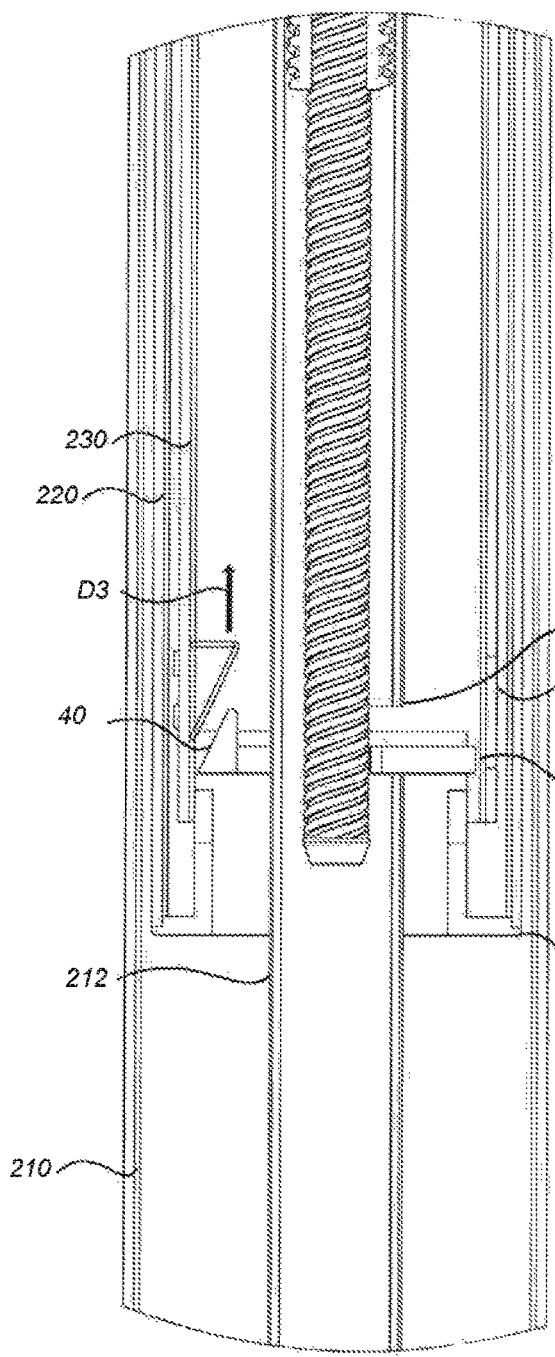

With reference to FIG. 4e the inner column 230 continues to move upwards in the direction D3 and, having just passed the second predetermined engaging position, the intermediate column 220 has been fixated relative the outer 210 column by the fixating unit 400 being engaged in the engaging position. The fixating member 400 may be inserted into the fixating position by being resiliently loaded towards the fixating position. Additionally or alternatively, the second engaging portion 234 of the inner column 230 may be configured such that the fixating portion 400 is pushed into the engaged state by the second engaging portion 234 during upwards movement of the inner column 230. For example, this is achieved by wedge or ram or tapered surface of the second engaging portion 234. Moreover, in some implementations wherein the fixating position of the fixating member 400 comprises the fixating member being inserted into an aperture 214 of the central body 212. The aperture 214 or a portion of the fixating member 400 (facing the aperture 214) may be tapered and/or angled so as to allow smoother insertion or removal of the fixating member 400 into/from the fixated position.

Figure 4F:
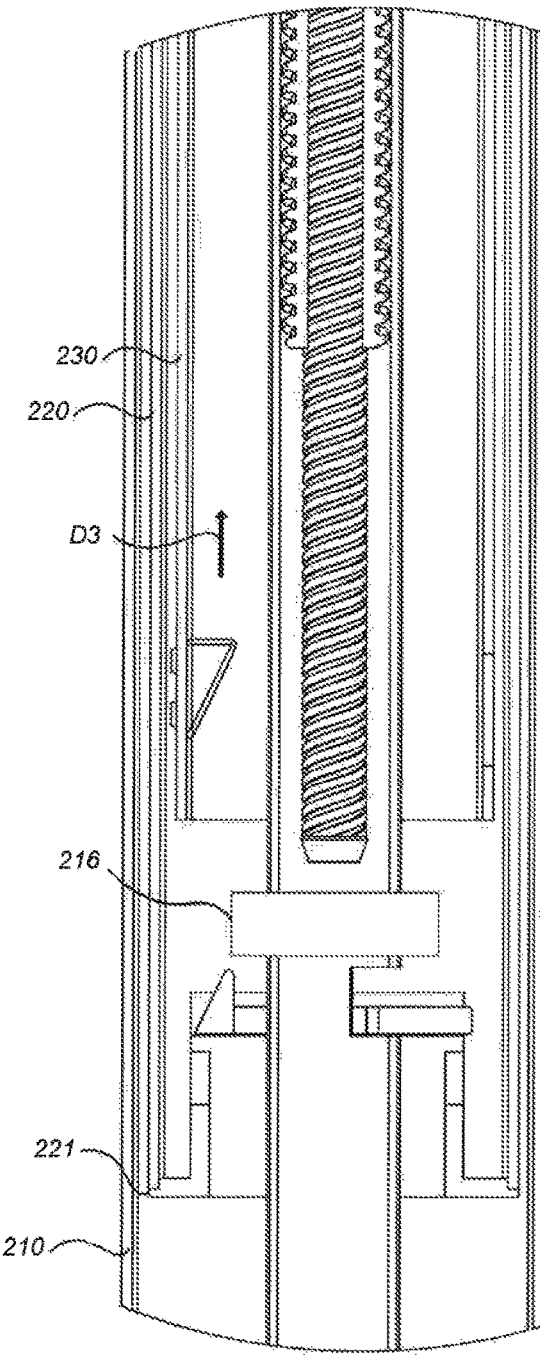

In FIG. 4f the inner column 230 continues to move upwards towards and extended state of the upper stroke length range. The intermediate column 220 being fixated to the outer column 230. Furthermore, FIG. 4f depicts a stopping portion 216 of central support body 212 adapted to engage the fixating member 400 and/or the fixating member housing 221 so as to prohibit faulty displacement of the fixating member 400 beyond the fixating position.

With reference to FIG. 4b and FIG. 4e the possible difference in positioning between the intermediate column 220 and the inner column 230 in the first and second predetermined engaging positions, or equivalently, the partial overlap of telescopic column states for the upper and lower stroke range may be deduced. Coming down from an upper stroke range state, the first engaging portion 232 of the inner column 230 disengages the fixating member 400 in the first predetermined engaging position depicted in FIG. 4b. Coming up from a lower stroke range state, the outer column may be pulled upwards by the inner column at a position wherein e.g. the inner column 230 is ahead of the intermediate column 220. Accordingly, the inner column 230 may be positioned differently relative the intermediate column as the columns 220, 230 reach the second predetermined engaging position wherein the height position of the intermediate column 220 is fixated. In some embodiments, this is brought by the second engaging portion 234 of the inner column 230 being a slot adapted to receive the fixating member 400 at a variety of positions.

FIG. 5a and FIG. 5b each depicts an exploded view of some features of the telescopic column. In some embodiments, the fixating member 400 is axially fixated to the intermediate column while being enabled to be disengaged and engaged so as to fixate the position of the intermediate column relative the outer column. This may be achieved by the fixating member being positioned in a fixating member housing 221 fixated to the intermediate column, e.g. doubling as a bottom end cap 221 of the intermediate column. Wherein the fixating member housing 221 is adapted to receive the fixating member 400, reliantly hold the fixating member 400 axially while allowing the fixating member 400 to move radially so as to be in the engaged or disengaged state.

In some implementations, the fixating member 400 and the fixating member housing 221 comprises an opening for receiving a central body 212 and enabling axial movement of the intermediate column relative the outer column. The fixating member 400 may be resiliently loaded and/or pushed towards the fixating position, i.e. against the central body 212, so as to slide along the central body 212 in the disengaged state and be inserted into the aperture 214 of the central body 212 in the engaged state. The central body 212 may comprise a threaded portion which engages the linear screw 320 so as to provide the driving means for the telescopic column. In other embodiments, the central body 212 is arranged separately from a threaded portion used to engage the linear screw 320. Further depicted is the extension screw 216 in an at least partially extended state relative the central body 212.

Figure 6:
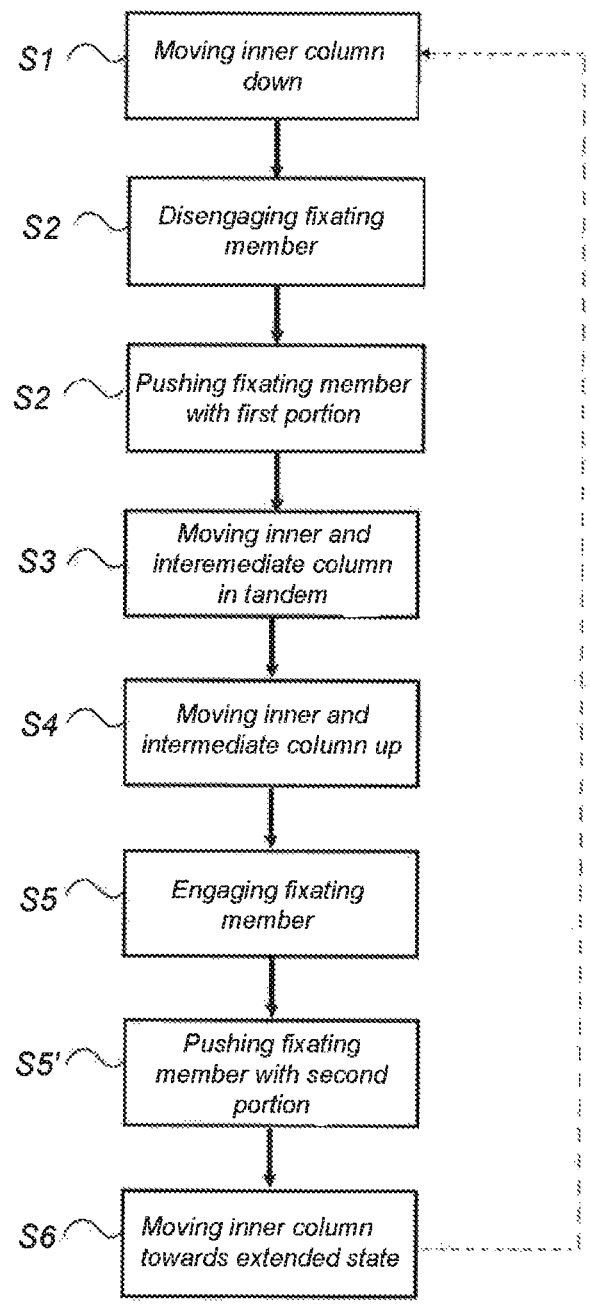
FIG. 6 illustrates a flow chart describing a method according to embodiments of the present invention.

FIG. 6 illustrates a flow chart of a method according to embodiments of the present invention. Starting from an extended state, i.e. an upper stroke range state wherein the intermediate column is fixated relative the outer column the inner column is moved downwardly relative the intermediate column and the outer column at S1. Upon reaching the first predetermined engaging position, step S2 comprises disengaging the fixating member so as to allow the intermediate column to move relative the outer column. Optionally, step S2 comprises step S2' of pushing the fixating member with a first engaging portion of the inner column from an engaged state to a disengaged state. With the fixating member disengaged at step S2 the method goes to step S3 comprising moving the inner and intermediate column in tandem. For example, downwardly moving the inner and intermediate columns in tandem. In some implementations, the intermediate column is fitted tightly around the inner column such that friction forces will at least contribute to the columns moving in tandem. In some implementations, the inner column comprises a lifting and/or pushing portion adapted to engage the intermediate column so as to push or lift the intermediate column in tandem with the inner column when the fixating member is disengaged. The fixating member may be adapted to engage the pushing/lifting portion of the inner column in the disengaged state.

At step S4 the inner and intermediate column moves in tandem towards an extended state. That is, the inner and intermediate columns move in tandem in a lower stroke range upwards towards the second predetermined engaging position. At S5, the fixating member is engaged when the inner and intermediate columns are in the second predetermined engaging position. For example, the fixating member is spring loaded towards the fixating position and the intermediate and inner column reaches a position wherein the fixating member is enabled to be inserted (e.g. by the resilient loading force) into the fixating position. The fixating member fixates the position of the intermediate column relative the outer column allowing the inner column to move independently in one direction (e.g. upwards) or in the other direction (e.g. downwards) to disengage the fixating member and move in tandem with the intermediate column. Optionally, the fixating member is engaged at sub-step S5' wherein a second engaging portion (for example in the shape of a slot in the inner or intermediate column configured to receive the fixating member in the disengaged state) pushes the fixating member into the engaged state from the disengaged state at the second predetermined engaging position. In some implementations, the second engaging member pushes the fixating member towards the fixating position. For example, this is enabled by a wedge or angled surface which contacts the fixating member so as to push it against the fixating position direction. At S6 the intermediate column is fixated to the outer column while the inner column is enabled to move in relation to the intermediate and outer column. Thus, for the largest extension lengths of the telescopic column the inner column will at least partially extend beyond the intermediate and outer column. As illustrated by the dashed line in FIG. 6 the method may be repeated, and the method may after any step be interrupted and run in the reverse order according to embodiments of the present invention.

The skilled person in the art realizes that the present invention by no means is limited to the embodiments described above. The features of the described embodiments may be combined in different ways, and many modifications and variations are possible within the scope of the appended claims. In the claims, any reference signs placed between parentheses shall exclude the presence of other elements or steps than those listed in the presence of a plurality of such elements.

The invention claimed is:

1. Telescopic column for a height adjustable furniture, comprising:
   an outer column,
   an intermediate column, located radially inside the outer column,
   an inner column, located radially inside the intermediate column,
   further comprising a fixating member configured to fixate the height position of the intermediate column at a predetermined height position relative the outer column when said telescopic column is in an upper stroke range,
   wherein the inner column is adapted to be driven by a driving unit and comprises a first engaging portion for interacting with the fixating member such that the fixating member is disengaged and enables the inner column to move in tandem with the intermediate column relative the outer column, when the telescopic column is in a lower stroke range, and
   wherein said fixating member is resiliently loaded towards a fixating position.

2. The telescopic column according to claim 1 wherein said telescopic column is adapted to be driven by a single driving unit.

3. The telescopic column according to claim 1, wherein said telescopic column further comprises:
   a central body being axially fixated to the outer column and being located radially inside the inner column, wherein said central body is adapted to interact with the fixating member.

4. The telescopic column according to claim 3, wherein said central body comprises an aperture for receiving said fixating member.

5. The telescopic column according to claim 1, wherein the fixating member is axially fixated to the intermediate column.

6. The telescopic column according to claim 1, wherein the inner column comprises a lifting portion, wherein said lifting portion is adapted to lift said intermediate column at the lower stroke range.

7. A furniture comprising the telescopic column according to claim 1.

8. Telescopic column, for a height adjustable furniture comprising:
- an outer column,
- an intermediate column, located radially inside the outer column,
- an inner column, located radially inside the intermediate column,
- further comprising a fixating member configured to fixate the height position of the intermediate column at a predetermined height position relative the outer column when said telescopic column is in an upper stroke range,
- wherein the inner column is adapted to be driven by a driving unit and comprises a first engaging portion for interacting with the fixating member such that the fixating member is disengaged and enables the inner column to move in tandem with the intermediate column relative the outer column, when the telescopic column is in a lower stroke range,
- wherein said telescopic column further comprises a central body being axially fixated to the outer column and being located radially inside the inner column, wherein said central body is adapted to interact with the fixating member.

9. A method for collapsing and extending a telescopic column, for a height adjustable furniture, comprising the steps of:
- from an extended state, downwardly moving an inner column inside an intermediate column towards a first predetermined engaging position,
- in the first predetermined engaging position disengaging a fixating member from a fixating position, the fixating member fixating the height position of the intermediate column relative an outer column, wherein said fixating member is resiliently loaded towards the fixating position,
- moving said inner column and said intermediate column in tandem inside said outer column towards a collapsed state,
- from a collapsed state, upwardly moving said inner column and said intermediate column in tandem towards a second predetermined engaging position,
- in the second predetermined engaging position, engaging the fixating member fixating the height position of the intermediate column relative the outer column, and
- moving said inner column towards an extended state.

10. The method according to claim 9, wherein the step of disengaging the fixating member comprises:
- pushing the fixating member with a first engaging portion of the inner column from an engaged state to a disengaged state.

11. The method according to any of claim 9, wherein the step of engaging the fixating member comprises:
- pushing the fixating member with a second engaging portion of the inner column from a disengaged state to an engaged state.

* * * * *